June 23, 1953 — M. J. QUILLINAN — 2,643,058
SLIDE RULE
Filed July 23, 1951 — 2 Sheets-Sheet 1
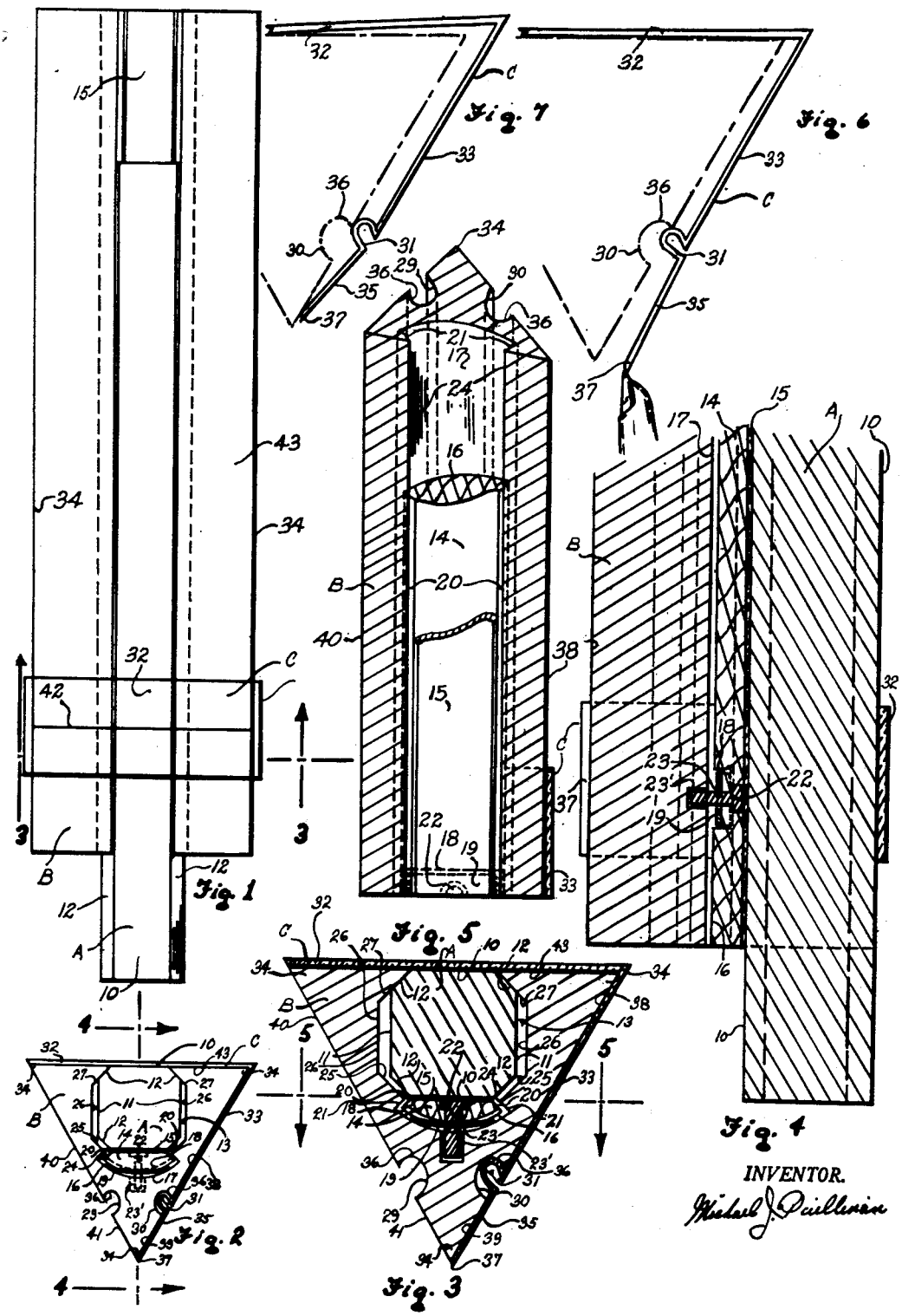
INVENTOR.
Michael J. Quillinan June 23, 1953     M. J. QUILLINAN     2,643,058
SLIDE RULE
Filed July 23, 1951     2 Sheets-Sheet 2
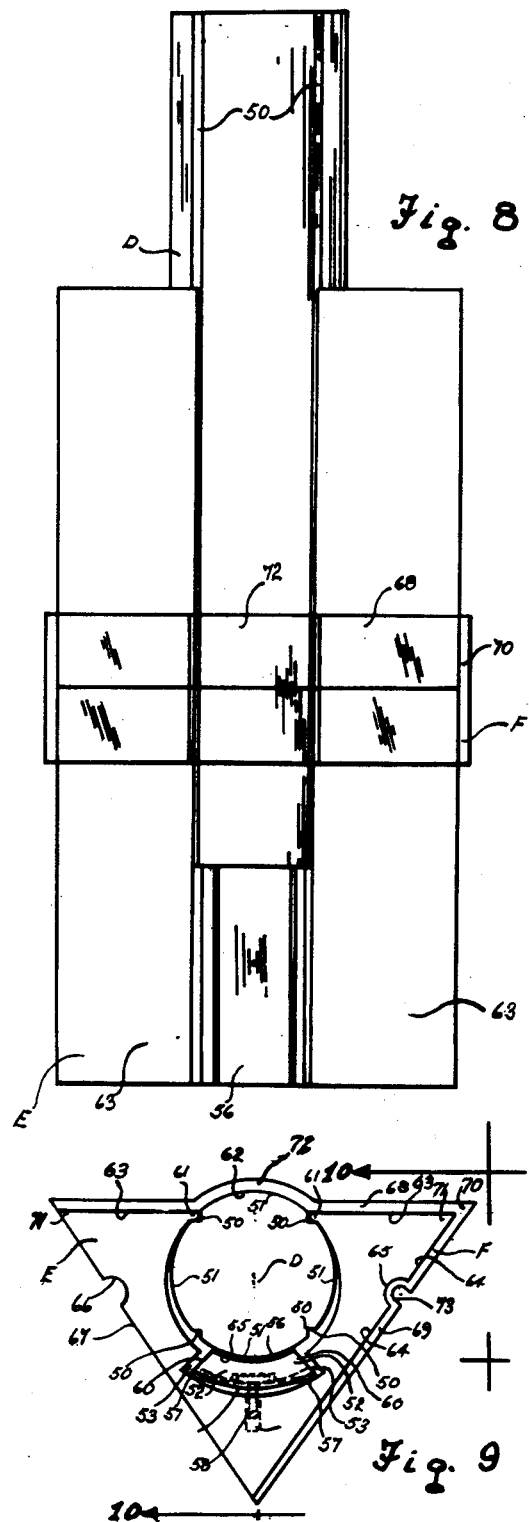
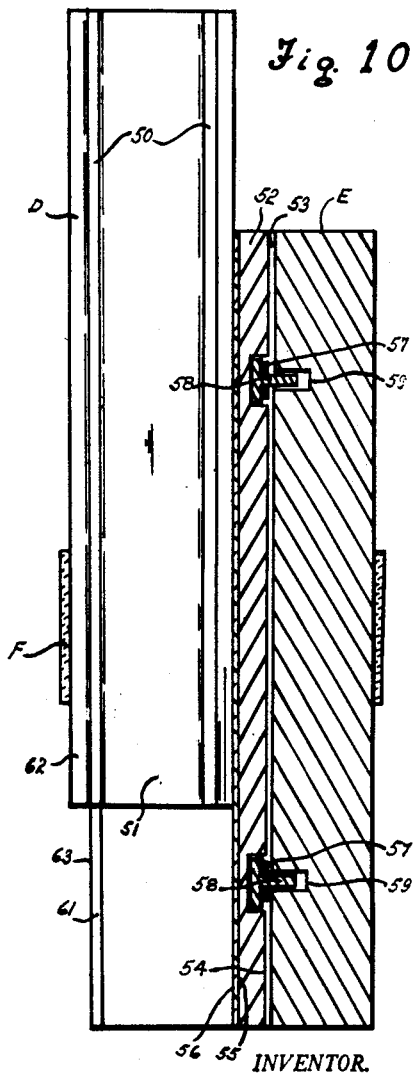
INVENTOR.
Michael J. Quillinan

UNITED STATES PATENT OFFICE 2,643,058

SLIDE RULE

Michael J. Quillinan, New York, N. Y.

Application July 23, 1951, Serial No. 238,044

27 Claims. (Cl. 235—70)

The present invention relates to an improved slide rule construction which lends itself readily to principles of mass production, while having an improved scale relation between the rule's reciprocating elements throughout the extremes of travel.

Heat and humidity increments have been the bane of a plurality of slide rule modifications heretofore practiced. Attempts at overcoming the adverse effects such increments have on rule accuracy, fluidity of handling and co-axial adjustment, heretofore, were directed to manually operated contrivances. Such latter devices were inconvenient in use and subject to abuse by the rule's user since the accuracy of adjustment was dependent upon the discretion used in making said adjustments. Also, the adjustments when made, had, at times, latent errors which even the most scrutable operator could not detect or correct.

The trend towards automatic adjusting means, though remedial, left much to be desired along lines of practicality, economy and sensitivity. While sensitivity of adjustment in such structures was increased, sensitivity to maladjustment due to the rigors of usage was correspondingly increased and in some instances, exceeded, because of the larger number of adjustable elements required to provide the automatic adjustment sought. Moreover, the cost of manufacturing and assembling these elements made the overall slide rule expensive, such that the cost required to achieve such automatic adjustment was not warranted despite the need for automatic adjusting and compensating means.

Frequently, slide rules are desirable which combine the computing function of ordinary slide rules with the measuring functions of rulers and other such instruments. While previous modifications may have been practically rendered in this regard, it has been infrequent that a slide rule having as increased a ratio of usable scale surface area per unit of rule cross-sectional area, as is herein disclosed, has been practiced.

Moreover, such rule modifications, when used for linear measurements, have been limited in size and quantity of scale area, since the same measuring edge could be used for only one series of linear scale measurements, inaccuracies being increased as the scales provided thereon are further removed from the measuring edge.

Briefly, my invention consists of a polygonal slide housing, wherein is slideable a generally polygonal or cylindrical slide, and wherein is contained automatic adjusting and compensating means which resiliently space said slide from said housing. In combination with the above novel arrangement, as will be hereinafter disclosed, is a unique index, which may embrace a substantial portion of the outline of the slide and is resiliently placed thereon and removeable therefrom by a unique configuration also to be hereinafter disclosed.

It is among the primary objects of the invention, therefore, to provide a slide rule having automatic adjusting and compensating means, which maintain the rule's reciprocating elements coaxial throughout the extremes of reciprocation, while having a sturdy and economical construction.

Another object of the invention is to provide a slide rule having sensitivity of automatic adjustment to the effects of increments of heat and humidity, which slide rule, and the compensating means thereon, are not unduly sensitive to the rigors of hard usage.

A further object of the invention is to provide a slide rule having a large amount of scale area and having automatic adjusting and compensating means provided thereon, which means are permanently stationed in the rule structure.

Still another object of the invention is to provide a slide rule having automatic adjusting and compensating means that are economical and practical, while providing in a new and novel rule construction, a high ratio of scale area per unit of cross-sectional area.

Still another object of the invention is to provide a slide rule having a high ratio of scale surface area to scale cross-sectional area and an equally high useable linear scale measuring area per measuring edge.

Still another object of the invention is to provide a measuring index which combines with the scaled reciprocating portions of a slide rule in an expandable and uniquely replaceable manner, such that a plurality of linear scales may be provided on at least one surface of a many-sided ruling device.

A still further object of the invention is to provide a slide rule index, which index resiliently embraces portions of the scaled periphery of the rule and provides for the ready comparison of linear measuring scales while at the same time allowing increased ease of reciprocation of said scales along their respective measuring edges.

Other objects will be in part obvious and in part pointed out as the description progresses.

In the following figures wherein similar reference characters refer to similar parts, the scales provided on a slide rule are deleted for sake of clarity since the invention is directed to a rule structure and the novel means for assuring improved reciprocation of the scaled parts, as well as the provision of calculating and measuring surfaces in combination, generally.

Figure 1 is a lengthwise plan view of one embodiment of the slide rule.

Figure 2 is an end view of the slide rule in Figure 1.

Figure 3 is an enlarged transverse sectional view of the slide rule taken along line 3—3 in Figure 1.

Figure 4 is an enlarged longitudinal sectional view of a portion of the rule shown in elevation.

Figure 5 is a plan view of a section of the rule shown in Figure 3 taken along line 5—5 in Figure 3, wherein portions of the rule are broken away to pronounce in clearer fashion the configuration of the slide rule's adjusting elements.

Figure 6 is a side view of the index claimed and described in the accompanying specification which index is in its intermediate stages of replacement on the slide rule, the latter being shown in outline.

Figure 7 is a similar view of the index shown in Figure 6 at a later and final stage of removal of the index from the slide rule.

Figure 8 is a lengthwise plan view of a second embodiment of the slide rule.

Figure 9 is an end view of the slide.

Figure 10 is a longitudinal elevation with parts in section, taken along line 10—10 of Figure 9.

One particular embodiment of the rule as shown in Figures 1–7 consists of a substantially rectangular flat-sided slide A having flat sides 10 and 11 and corners, 12, which are respectively parallel and travel within a triangular slide housing B, the latter having a beveled channel, generally shown as 13, which houses the slide A and automatic adjusting and compensating means.

The automatic adjusting and compensating means comprises a bearing strip 14, having felt or felt-like material 15 secured on the flat upper face thereof. The underface 16 of bearing strip 14 is convexly cambered on its length throughout and is substantially matingly receivable on the arcuately concave lower face 17 of the channel area 13. Substantially disposed in transverse convex spring seats 18 of bearing strip 14, between the face 16 of strip 14 and the lower face 17 of the channel 13, are at least one, and preferably a plurality of, flat springs 19. The sides 20 of strip 14 slant outward and downward such that the springs 19 are kept under tension between the spring seats 18 and the channel's concave lower face 17, by means of the channel's beveled sides 21, which substantially retain the strip 14 resiliently within the housing slide B, along the length thereof.

Whereas the cross-section of bearing strip 14 has been described as cambered on its lower surface 16, it may also be described as being substantially sector-shaped. It is important that the strip 14 be wider at a position farther removed from the first face 43 than it is at at least one portion closer thereto. It may, for example, be trapezoidal, the narrower face of the trapezoid being closer to the first face than is the broader face thereof. In this manner, the strip may be substantially secured in the channel due to the fact that the channel is wider in at least one inner portion than at a portion closer to said face.

To station the strip 14 so that neither it nor the springs 19 may move out of position in the housing slide B, at least one, or preferably a series of, retainers or pins 22 extend downwardly through the strip 14 into holes 23 provided on the face 17 of the channel 13.

It will be noted that the pins 22 further secure the flat springs 19 in stationed position by passing through a hole portion 23 in each of the springs and thence into the holes 23' of the slide housing B.

At the throat provided at the upper extremity of channel sides 21, the channel is beveled substantially outwardly and upwardly on sides 25 and 26, respectively, and thence finally the bevel is re-directed on channel sides 27 which are evenly engageable with the beveled edges or corners 12 of flat slide A.

For convenience, the surfaces 27 of housing B will be referred to as the first bearing surfaces, and are though of as being inwardly directed; the beveled edges or corners 12 will be referred to as outwardly directed second bearing surfaces, and particularly refer to that pair of surfaces which are in engagement with the above inwardly directed first bearing surfaces; the flat sides 10 or 11 of the slide A, and in particular, that single side furthest removed from the mouth of the channel area 13 will be referred to as an inwardly directed third bearing surface; the flat upper face of the bearing strip 14, together with the felt material secured thereto, will be hereinafter referred to as a fourth, upwardly directed bearing surface.

An expandable index C embraces the housing B coaxially and slideably therealong. Grooves 29 and 30 are provided on the sides of the housing B to alternately receive an indenture or projection 31, provided on one of the sides of the angular index C, which sides consist of transparent windows 32 and 33, flexibly interrelated and angularly disposed with respect to one another. The angular disposition of these windows is less in radian measurement than the radian measurement at either of the apices 34 of the housing B.

Each of the grooves 29 and 30 are equally spaced from the apex of the housing B, opposed to the face thereof containing the mouth of the channel in the first face 43. Each groove projects inwardly away from its respective face, 40 and 39; and toward the first face 43, whereby the edge of each of the grooves closest to the first face 43, is further removed along its respective face than is at least one portion of the internal envelope of the groove, whereby a hooked portion is formed in each of the grooves.

Moreover, the axis of projection 31 is substantially angularly tilted from a perpendicular position relative to the face 33 of the index C, while the axis of its internal envelope remains parallel to an edge of said housing, the free end window 35 of the window 33 being substantially angularly disposed relative to the plane of the latter.

The above angular disposition of the windows of index C refer to the index in a natural unflexed condition, as viewed in Figure 7, the relative position of the windows being altered when index C is inserted in place on housing B. Thus, when the projection 31 of index C is received in place in either grooves 29 or 30, windows 32, 33 and 35, as well as the axis of projection 31 are respectively rotated to conform to the outline of housing B.

Grooves 29 and 30 are adapted to alternately matingly receive portions of the projection 31 on the hooked upper face 36 of the grooves, such that the windows 32 and 33 are resiliently strained on the housing B and in registering relation with the slide A by the hooked portion 36 which acts in combination with these transparent windows.

Thus, it will be seen that the means for securing the index C to the housing B comprises the flexible inter-relationship of first and second windows 32 and 33, the indenture or projection 31, the hooked upper face 36 of groove 30, and the lower extremity or flexible projection 37. Although the projection 31 may be formed integrally with the remaining portions of the index C, it may also be separately fabricated and secured to the index.

It will be seen from inspection of Figure 3, that when the index C is seated in position on the slide rule, the free end window 35 and the window 33 are substantially coplanal while the projection 31 is snugly received within the upper hooked portion of the groove 30. By viewing Figure 7, the index C in its natural unflexed state, it will also be seen that since all three of the index's windows, namely, 32, 33 and 35, are angularly displaced into a tensed relationship with the housing slide B, snugness of fit of the index C and resiliency are thereby executed. Thus, when the index C is in cocked position, the free end window 35, as viewed in Figure 7 is rotated counter-clockwise to act in combination with the projection 31. Likewise, the window 33 is displaced downwardly, such that the point of jointure of windows 32 and 33 resiliently contain and engage the apex 34.

Figure 6 illustrates the manner by which the index C may be removed from the housing B. A finger nail or other similar object when implemented by the rule's user, may be inserted beneath the lower extremity 37 of the free end window 35 to rotate the latter counter-clockwise as viewed in Figure 6, about the projection 31, while at the same time, sliding the latter from the enclosed portion of the groove, thereby sliding the transparent index window 33 away from contacting relationship with its respective housing B. Thus, as the indenture 31 clears the hooked portion 36 and external pressure of the manipulator's fingers is removed, the index snaps out of engaging relation with the housing slide B.

It will be noted that the flat surfaces 38 and 39 of the housing B, which are respectively engaged by the transparent windows of the index C, may have provided thereon linear measurements such as are in common usage on engineer's and architect's scales. Similarly, the opposite surfaces, 40 and 41, of the housing B, may also have provided thereon similar linear graduations such that the rule has properties similar to a measuring instrument in addition to that of a computing device, as has been hereinabove described. Indeed, the functions of these scales are not mutually exclusive but rather may be effectively combined by the use of the hairline 42, provided on the inner surface of the index C, which surrounds the scaled portions of the housing B and slide A.

It will also be noted that by use of the novel index C, the free end window 35 is kept closely in tension upon the respective scaled surfaces of housing B such that the free end of the lower extremity 37 combines with the measuring edge of each apex to smoothly engage the measurable surface.

Moreover, since the index C is resiliently retained upon either of the coaxial grooves 29 or 30, the hairline 42 remains respectively perpendicular to the axes of the scales on A or B, thereby permitting linear graduations which are provided on the remote scaled portions 38 and 39 of the housing B to be compared readily with its corresponding parallel position on the reading edge of the apex 34, the latter being used to measure the distance between two points along the length of the slide rule.

In operation, the slide A is suspended along one of the sides 10 by the felt layer 15 on bearing strip 14, which, in turn, is suspended by the potential energy of flat springs 19 as they rest in cocked position within the convex spring seats 18 between strip 14 and concave channel face 17.

It will be noted that the planes of channel sides 21 effectively contain the evenly engageable sides 20 of bearing strip 14 when the slide A is removed from the housing slide B. Thus, when use of another side 10 or 11 of rectangular slide A is anticipated, the same may be removed, and the resilient relationship of the strip 14 to the housing slide B will be maintained coaxially. By displacing strip 14 downward within the channel areas 13, the rectangular slide A can be returned to yielding sliding relation to the housing B. It should also be noted that the channel sides 27 effectively contain along the first bearing surfaces portions of beveled corners on edges 12 of rectangular slide A, hereinabove referred to as the second bearing surfaces, and restrain the latter to reciprocate coaxially within the housing B.

When the effects of the hereinabove-mentioned increments of temperature and humidity occur, a noticeable friction would ordinarily result between the engaging surfaces of the heretofore practiced slides. This friction may have been due to moistened surfaces or swelling of the rule material as well as surface friction phenomena between the native material of the rule itself. When such effects are encountered in the instant rule modification, the friction is uniformly relieved by the springs 19 yielding to allow the bearing strip 14 to lower itself and thereby reduce the normal pressure existing between channel sides 27 and corners 12. Correspondingly, the tangential resistance to fluid reciprocation is alleviated and ease of handling results.

The felt layer, 15, in addition to cleaning the graduations as the rectangular flat slide A reciprocates within the triangular housing B, also augments the fluidity of travel of the reciprocating slides. Moreover, such adjustment and compensation as takes place, in addition to being automatic, is coaxial throughout the extremes of reciprocation, since the respective under faces 27 and the beveled corners 12 are maintained in close engagement throughout. Also, faces 26, being integral parts of a sturdy structural unit, namely, the housing B, remain respectively aligned as between themselves and with respect to the equally integral contacting corners 12 of rectangular slide A.

The above construction results in a more fluid reciprocation of the scaled elements of the rule. Also, the angular index C, being expandable on the scaled faces of both slides, permits still further fluid travel of the rule parts. This effect is accomplished, moreover, coaxially, such that the hairline 42 provided on the index C will not gyrate due to any eccentric application of force by the rule's user in positioning the index. It will be seen that the grooves 29 and 30 resiliently contain the index projection 31 and restrain the contacting surfaces of the index to be in close yielding engagement with the scaled portions of the reciprocating slides.

It will be seen, also, that such a rule construction is both feasible and highly economical in manufacture, both with respect to the triangular or polygonal housing slide B and the rectangular flat slide A. For example, the use of certain magnesium alloys and plastics has come into popular practice. Such alloys and plastics may be extruded into long prismatic lengths having uniform cross sections throughout. The slide rules presently practiced have used such alloys as the basic material from which slides are manufactured, thereby reducing the added expense of separate machining operations.

Both the housing B, with its beveled channel faces, and the rectangular slide A, may also correspondingly be extruded into uniform sections thereby lending a principle of economy of manufacture wherein automatic adjusting and compensating means may be effectively practiced.

By the unique beveled arrangement, the rule may be more readily assembled. Thus, by inserting springs 19 into their respective spring seats 18, the bearing strip 14 may be slid into place in the channel throat 24, the pins 22 inserted into holes 23 and the strip 14 thereby resiliently stationed ready to receive the rectangular slide A.

A second embodiment of my invention, as shown in Figures 8, 9 and 10 of the drawing, includes a substantially circular-prismatic slide D having a plurality of beveled grooves 50 which are parallel to the longitudinal axis of slide D. These beveled grooves are formed by a substantially right-angled cut in the surface of the slide, and are equally displaced about the circumference thereof. Between each pair of grooves 50 is a calculating face 51. Slide D is adapted to reciprocate along its longer axis, and parallel to the larger axis of housing E.

The housing E contains automatic adjusting and compensating means including strip 52, resting in an inner pocket 53 of the housing. In this embodiment, the strip 52 has a cross section formed as a segmental portion of an annulus. It is convexly cambered on its lower surface 54 to ride on the lower face of the pocket 52. The upper face 55 is concavely cambered to coincide with the surface of slide D which face contains a felt-like material 56 along its length. The strip 52 is generally formed similarly to the strip 14 of Figures 1–5, the major differences being the concave upper surface 55.

The underside 54 of strip 52 is spaced from the lower face of the pocket 53 by means of one or more springs 57, fitting into pockets on the underside 54 of the slide, and which exert a pressure against the slide 52. The spring 57 is secured in place against inadvertent longitudinal movement by pin 58 which rests in hole 59, and which passes through spring 57. Rotational movement of spring 57 about the hole 59 may be prevented by making the hole and the pin square or generally non-circular and this, together with a similarly formed hole in the spring will render the spring fixed. If this is done, the pockets may be eliminated from the the under side of slide 52.

The sides 60 of the strip 52 generally flare outwardly and downwardly, to matingly conform to the correspondingly formed sides of the inner pocket 53 of the housing. Thus, a downwardly directed force is received which fixes the strip more or less securely in the pocket.

The housing E, containing the slide D, is formed with a narrow throat at the upper extremity of the slide-containing cavity. The throat is bounded by edges 61, each of which is bounded by substantially flat surfaces positioned at right-angles to one another. These edges 61 are adapted to fit into the grooves 50, and in connection therewith to rigidly retain the slide from circumferential or radial motion while in use.

Operating surface 62, containing calculating scales, is contained between edges 61 and, due to its curvature, it projects somewhat above face 63 of housing E.

Housing E is enveloped, in part, by expendable index F, which embraces first face 63 and second face 64 of housing E. Grooves 65 and 66 are provided on second face 64 and third face 67 of housing E. These grooves extend entirely along the length of housing E and are parallel to the longitudinal axis thereof.

The index D includes a pair of transparent windows each of length sufficient to extend over each of the first and second faces of the housing, the flexible windows, 68 and 69, being joined at an apex 70. Apex 70 in its normal unflexed condition, includes a somewhat smaller angle than does apex 71 of the housing E, whereby a tension is present when index F is in position whereby it is retained on housing F.

Window 68 contains a curved portion 72, adapted to fit around the surface of slide D. Window 69 contains a projection or indenture 73 adapted to fit into and to cooperate with groove 65. It is apparent that the combined faces of the flexed apex 70, the curved portion 72 of the window 68, and the indenture 65 of window 67 will serve to retain the index in position on housing E.

It is further apparent that indenture 73 may coact with groove 66, and that window 69 may be made to cover face 67 of housing E, by the simple expedient of sliding the index off the end of the housing, and, after rotating it through 180 degrees in the plane of window 68, reinserting the index into position.

Also the index may more easily be transferred in the manner described in connection with Figures 1–7. This embodiment differs from that of Figures 1–7 in not requiring a hooked position in either the grooves or the indenture, the curved portion 72 of the window providing substantially the same result in cooperation with indenture 65 as would a hooked portion thereof.

In operation, to transfer a new scale of slide D into juxtaposition with face 63 of housing E, the slide D is forced into the channel or recession in the housing by manual pressure, and a second calculating face is brought into the line of vision by manually rotating slide D about its axis. This may be done by manual rotation of an extended portion of the slide D. To facilitate this rotation, the corners of edges 61 may be rounded off.

It will be noted that the combination of pin 58, spring 57 and the strip 52, when contained in pocket 53, are distinguishable from the first hereinabove modification, in that the pin 58 does not pass completely through strip 52. This arrangement of elements provides a more readily assembled slide rule housing with automatic adjusting and compensating means. Thus, in assembly, the pin 58 is passed through spring 57 and rotationally locked in place, being generally of non-circular interfitting relation therewith, and is disposed in a hole 59. By manually displacing spring 57 by means of pin 58 being displaced downwardly into the hole 59, the strip 52 may then be slid into place within the inner pocket 53 of the housing E. By releasing such manual pressure when the upper extremities of pins 52 are opposite to the pockets adapted to matingly receive them on the underside 54 of the strip, the latter is thereby permanently and securely locked into longitudinal and radially displaceable position with respect to said housing.

It will be seen that the advantages to be gained by combining the calculating and measuring functions as in the first-mentioned modification, may be practiced equally as well in this second modification. It is also apparent that the automatic adjusting and compensating means as disclosed in Figures 8–10 function in substantially the same manner as that hereinabove described in connection with Figures 1–5. Similarly, the advantages of an elastic index may be gained equally well in either embodiment, i. e., more fluid reciprocation of the index on the slide rule, and also the cooperating action with the functioning of the automatic adjusting and compensating means.

Having fully described my invention, what I claim is:

1. In an improved slide rule having an elongated substantially triangular-prismatic housing containing three faces, at least the first face of which contains an elongated open channel, an elongated slide in said channel, said slide extending throughout at least a portion of the length of said channel and being reciprocable therein, means on said housing for retaining said slide in said channel, and at least one numbered scale on each of said housing and said slide, an index means for registering coincidence between a numbered scale on said housing and a numbered scale on said slide which has a first index window extending from a point adjacent to an apex of a first and a second face to a point on said first face substantially removed from said apex, a second window joining said first window at said apex, said second window extending to a point on said second face substantially removed from said apex, means on said second face for securing said index to said housing, means on at least one of said windows for releasing said index from said secured position, and means on at least one of said windows for registering coincidence between a numbered scale under one portion of said index with a numbered scale under a second portion of said index.

2. A slide rule index to fit about the apex of a triangular slide rule having a first transparent window, a second transparent window joining said first transparent window at a vertex having an angle less than the angle of the apex of said triangular slide rule, said first and second windows being flexibly interrelated, a third window forming an extension of said second window flexibly related thereto and, in its unflexed state, extending toward said first window, and a projection on said second window projecting toward said first window, at least a portion of said projection being closer to said vertex than the portion of said projection immediately adjoining said second window.

3. An improved slide rule assembly comprising a triangular prismatic, attenuated housing having an elongated slide-receiving channel in a first face thereof, and a groove on each of the second and third faces thereof, each of said grooves being equally spaced from the apex of said housing opposed to said first face, each groove projecting inwardly away from its respective face and toward the first face whereby the edge of each of said grooves closest to said first face is further removed along its respective face than is at least one portion of the internal envelope of said groove whereby a hooked portion is formed in each of said grooves.

4. An improved slide rule assembly comprising a triangular prismatic, attenuated housing having an elongated slide-receiving channel in a first face thereof, a groove on each of the second and third faces thereof, each of said grooves being equally spaced from the apex of said housing opposed to said first face, each groove projecting inwardly away from its respective face and toward the first face whereby the edge of each of said grooves closest to said first face is further removed along its respective face than is at least one portion of the internal envelope of said groove, whereby a hooked portion is formed in each of said grooves, and an index on said housing resting on said first face and on at least one of said second and third faces, and cooperating with said groove on one of said second and third faces, whereby said index is retained in place on said housing.

5. A slide rule assembly comprising a triangular-prismatic housing having therein a channel in a first face thereof and grooves in each of a second and third face thereof, a polyganol prismatic slide in said channel, a longitudinally stationed bearing strip separating a portion of said slide from a portion of said housing, spring means between said housing and said strip whereby said strip and said slide are urged into relationship, a transparent elastic index covering at least a portion of said first face and a face selected from the group consisting of the second and third faces, and securing means on said index whereby it is secured in cooperation with said groove on said second face.

6. A slide rule assembly comprising a triangular-prismatic housing having therein a channel in a first face thereof, a prismatic slide of circular cross-section in said channel, a fixed bearing strip separating at least a portion of said slide from a portion of said housing, spring means between said housing and said strip whereby said strip and housing are urged into contact relationship, a transparent elastic index covering at least a portion of said first face and a face selected from the group consisting of the second and third faces, and retaining means on said index whereby it is retained in cooperation with said second face.

7. A slide rule index to fit about the apex of a polygonal slide rule having a first window, a second window joining said first window at a vertex having an angle less than the angle at the apex of said polygonal slide rule, said first and second windows being flexibly interrelated, a third window forming an extension of said second window flexibly related thereto and, in its unflexed state, extending toward said first window, and a projection on said second window projecting toward said first window, at least a portion of said projection being closer to said vertex than the portion of the projection immediately adjoining said second window.

8. A slide rule index to fit about the apex of a triangular slide rule having a first window, a second window joining said first window at a vertex having an angle less than the angle of the apex of said triangular slide rule, said first and second windows flexibly interrelated, a third window forming an extension of said second window, a projection connecting said second and third windows, said projection projecting toward said first window, said first window adapted to register with exposed reciprocating faces of said slide rule, at least one portion of said first window cambered, said first window complementary to said faces.

9. A slide rule index to fit about the apex of a triangular slide rule having a first window, a second window joining said first window, said first and second windows flexibly interrelated, a third window forming an extension of said second window, a projection connecting said second and third windows, said projection projecting toward said first window, said first window adapted to register with exposed reciprocating faces of said slide rule, at least one portion of said first window cambered, said first window complementary to said faces.

10. An improved slide rule assembly comprising a triangular, prismatic, attenuated housing having an elongated slide-receiving channel in a first face thereof, and a groove on at least one other face of said housing, said groove being spaced from the apex of said housing opposed to said first face, said groove projecting inwardly away from its respective face and toward said first face, the edge of said groove closest to said first face further removed along its respective face than is at least one portion of the internal envelope of said groove, a hooked portion being formed thereby in said groove.

11. An improved slide rule assembly comprising a triangular, prismatic, attenuated housing having an elongated slide-receiving channel in a first face thereof, and a groove on at least one other face of said housing, said groove being spaced from the apex of said housing opposed to said first face, said groove projecting inwardly away from its respective face and toward said first face, the edge of said groove closest to said first face further removed along its respective face than is at least one portion of the internal envelope of said groove, a hooked portion being formed thereby in said groove, a slide adapted to reciprocate with respect to said housing within said channel, said slide complementary to said channel, said slide having an exposed face flush with said first face.

12. An improved slide rule assembly comprising a triangular, prismatic, attenuated housing having an elongated slide-receiving channel in a first face thereof, and a groove on at least one other face of said housing, said groove being spaced from the apex of said housing opposed to said first face, said groove projecting inwardly away from its respective face and toward said first face, a cylindrical slide adapted to reciprocate with respect to said channel, the axis of said slide eccentric to the axis of said housing, said slide contained within said channel about a majority of its cross section, said channel complementary to said slide.

13. An improved slide rule assembly comprising a triangular, prismatic, attenuated housing having an elongated slide-receiving channel in a first face thereof, a groove on at least one other face of said housing, said groove being spaced from the apex of said housing opposed to said first face, said groove projecting inwardly away from its respective face and toward said first face, a slide adapted to reciprocate with respect to said channel, means for retaining said slide in said channel, at least one elongated arcuate face on said slide, said arcuate face exposed and in registry along its sides with said first face.

14. An improved slide rule assembly comprising a triangular, prismatic, attenuated housing having an elongated slide-receiving channel in a first face thereof, a groove on at least one other face of said housing, said groove being spaced from the apex of said housing opposed to said first face, said groove projecting inwardly away from its respective face and toward said first face, the edge of said groove closest to said first face further removed along its respective face than is at least one portion of the internal envelope of said groove, a hooked portion being provided thereby in said groove, an index resting on said first face and on at least one other face of said housing, said index having a projection having a hooked concave envelope co-operating with said groove, whereby said index is retained in place on said housing.

15. An improved slide rule comprising a triangular, prismatic, attenuated housing having scales on the external faces thereof, a slide-receiving channel in at least a first face of said housing, a groove on at least one other face of said housing, said groove being provided along the length of said housing, an apex on said housing opposed to said first face, said groove spaced from said apex, said groove projecting inwardly away from its respective face and toward said first face, a slide interfitting in said channel, means for retaining said slide in interfitting, reciprocable relation with said channel, at least one exposed face on said slide clearing the confines of said channel, said exposed face arcuate in section, an index resting on said first face of said housing and said exposed face of said slide, and complementary thereto, said index bounding at least one other face of said housing having a projection seated in said groove.

16. An improved slide rule comprising a triangular, prismatic, attenuated housing having an elongated slide-receiving channel in at least a first face thereof, a groove on at least one other face of said housing, an apex on said housing opposed to said first face, said groove projecting inwardly away from its respective face and toward said first face, a cylindrical slide interfitting with said channel, said slide on a majority of its perimeter being bounded by and reciprocable in said channel, at least the upper portions of said channel complementary to said slide, an exposed face portion of said slide clearing said channel, an index registrable with the first face of said housing and at least a portion of slide's exposed face, said index bounding at least one other face of said housing having a projection seated in said groove.

17. A slide rule assembly comprising a triangular, prismatic housing, a channel in a first face of said housing, a groove in at least one other face of said housing, a prismatic slide in said channel, a bearing strip separating a portion of said slide from a portion of said housing, spring means between said housing and said slide are urged into relationship, means for stationing said strip with respect to said housing, an elastic index covering at least a portion of said first face and one other face of said housing, and securing means on said index whereby it is secured in cooperation with said groove on the latter face.

18. A slide rule assembly comprising a triangular, prismatic housing having a slide and an index in combination therewith, a channel in a first face of said housing, said slide of circular cross-section residing in said channel, a bearing strip separating said slide from a portion of said housing, spring means between said strip and said housing whereby said slide and said strip are urged into contact relationship, said index covering at least a portion of said first face and at least one other face of said housing, and retaining means on said index whereby it is retained in co-operation with said other face.

19. In a slide rule of the character described in claim 18, grooved portions evenly dispersed about the face of said slide, said channel having upper extremities on its sides registrable with a corresponding number of said grooved portion and complementary therewith, said slide being depressible and rotatable within said housing against the action of said spring means.

20. In a slide rule wherein a slide reciprocates within a housing and is resiliently urged into registry with said housing, the combination of automatic adjusting and compensating means comprising a channel in a face of said housing, a strip in said channel adapted to support said slide, a leaf spring adapted to support said strip, said strip adapted to be contained within said housing by the sides of said channel, an under portion of said strip cambered, said leaf spring flexed between said under portion and said channel on its lower face, a pin passing from said under portion, through said spring, and into a holed portion on said lower face.

21. An improved slide rule and measuring instrument comprising a triangular, prismatic housing, at least one measuring scale on said housing, at least one calculating scale on said housing, a channel in at least a first face of said housing, a slide fitting snugly into said channel, at least one calculating scale on said slide, at least one apex on said housing, indexing means bounding said slide, said calculating scale, said measuring scale, said first face, and one other face of said housing, means for securing said indexing means to said housing so as to render said indexing means slideable therealong, said indexing means having at least one window thereon terminating on a side of said apex in an edge, said edge aligned with the plane of the other side of said apex.

22. An improved slide rule and measuring instrument comprising a triangular, prismatic housing, at least one measuring face on said housing, at least one calculating face on said housing, a channel in said calculating face, a slide snugly fitting into said channel, at least one calculating scale on said slide, at least one calculating scale on said calculating face, at least one apex on said housing, index means bounding said calculating face and one other face of said housing, means for securing said index means to said housing so as to be slideable therealong, said index means having at least one window thereon terminating on a side of said apex in a measuring edge, said edge aligned with the other side of said apex, said edge being an even continuation of said other side.

23. An improved slide rule and measuring instrument as claimed in claim 22 wherein at least one housing face includes a basic measuring scale immediately adjacent to said apex, and a plurality of subordinate scales arranged in cooperative relation to said basic scale.

24. In a device of the character described, a housing having a channel in a face thereof, a member slideable in and at least partially retained by said housing, a bearing strip retained in said channel, at least one spring compressed between said strip and the bottom of said channel yieldingly urging said member toward said housing face through intermediation of said strip, a pin seated at one end in said strip passing through said spring, a recess in the bottom of said channel receiving another end of said pin therein, whereby said strip is stationed against sliding in said channel as said member slides.

25. In a device of the character described, a housing having a channel in a face thereof, a member slideable in and at least partially contained by said housing, a bearing strip adapted to be inserted in said channel, said channel having sides overlapping said strip, recesses in the bottoms of said strip and said channel, a spring resting in said recesses yieldingly urging said member toward the face of said housing through intermediation of said strip, whereby said strip may be readily inserted in place and stationed against sliding in said channel.

26. A slide rule of triangular cross-section and an index in combination, said index having a first window, a second window joining said first window at an apex of said slide rule, a recess along a slide rule face adjacent said second window, at least one part of the internal envelope of said recess being closer to said apex than a point on said face further removed from said apex, and a projection on said second window complementary to said envelope of said recess latching said index on said rule.

27. A slide rule comprising a housing slide of triangular cross-section having a channel in a first face thereof, a second slide of generally circular cross-section for reciprocation in the housing slide channel and rotatable therein, said second slide surrounded on a major portion of its periphery by the housing slide and extending without the housing slide on a minor portion of its periphery, an index embracing the first face and one other housing face as well as said second slide's minor portion.

MICHAEL J. QUILLINAN.

References Cited in the file of this patent

UNITED STATES PATENTS

| Number | Name | Date |
|---|---|---|
| 416,030 | Clapp | Nov. 26, 1889 |
| 603,695 | Keuffel | May 10, 1898 |
| 887,390 | Hall | May 12, 1908 |
| 1,041,204 | Van Rensselaer et al. | Oct. 15, 1912 |
| 2,059,289 | Svensson | Nov. 3, 1936 |
| 2,468,191 | Fullilove | Apr. 26, 1949 |

FOREIGN PATENTS

| Number | Country | Date |
|---|---|---|
| 10,230 | Great Britain | May 5, 1903 |
| 110,851 | Great Britain | Nov. 8, 1917 |
| 152,123 | Austria-Hungary | Dec. 27, 1937 |
| 183,723 | Great Britain | Aug. 3, 1922 |